United States Patent [19]

Kenworthy et al.

[11] 3,950,478

[45] Apr. 13, 1976

[54] PROCESS FOR PRODUCING ALUMINA FIBER

[75] Inventors: Jeffrey Stuart Kenworthy; Michael John Morton; Michael David Taylor, all of Runcorn, England

[73] Assignee: Imperial Chemical Industries Limited, London, England

[22] Filed: Mar. 5, 1973

[21] Appl. No.: 337,845

[30] Foreign Application Priority Data
Dec. 21, 1972 United Kingdom............... 59108/72

[52] U.S. Cl......... 264/234; 264/DIG. 19; 264/176 F; 264/345; 423/625; 423/630; 423/631; 252/463; 252/464; 252/465; 252/466 PT; 106/288 B; 106/65; 252/62
[51] Int. Cl.²......................... C01F 7/02; C01F 7/30
[58] Field of Search.................. 423/625, 630, 631; 264/232, 234, 344, 345, DIG. 19

[56] References Cited
UNITED STATES PATENTS

| | | | |
|---|---|---|---|
| 2,915,475 | 12/1959 | Bugosh | 423/625 U X |
| 3,240,560 | 3/1966 | Spear | 423/625 |
| 3,417,028 | 12/1968 | Montgomery et al. | 423/628 X |
| 3,560,408 | 2/1971 | Kiehl et al. | 423/625 |
| 3,663,182 | 5/1972 | Hamling | 423/625 X |
| 3,684,443 | 8/1972 | Zirngibl et al. | 423/625 X |
| 3,716,605 | 2/1973 | Grimes et al. | 423/625 X |
| 3,870,737 | 3/1975 | Birchall et al. | 423/625 UX |

FOREIGN PATENTS OR APPLICATIONS

| | | | |
|---|---|---|---|
| 768,446 | 12/1971 | Belgium | |
| 1,360,197 | 7/1974 | United Kingdom | |
| 1,942,599 | 8/1969 | Germany | 423/625 |
| 165,052 | 12/1921 | United Kingdom | 423/625 |

*Primary Examiner*—Herbert T. Carter
*Attorney, Agent, or Firm*—Cushman, Darby & Cushman

[57] ABSTRACT

Alumina fibre is prepared by spinning a solution containing an aluminium compound and an organic polymer, removing solvent and contacting the fibre with ammonia or an amine before conversion of the fibre to alumina.

23 Claims, No Drawings

PROCESS FOR PRODUCING ALUMINA FIBER

This invention relates to alumina fibres and in particular to the production of alumina fibre from solutions of an aluminium compound having an acid anion.

In U.S. application Ser. No. 337,847 is described the preparation of alumina fibres by fibrising a composition comprising an aluminium compound decomposable to alumina, an organic polymer and a solvent for the aluminium compound and the polymer, removing at least part of the solvent and subjecting the fibre to hydrothermal treatment.

We have now found that when the aluminium compound has an acid anion, improved alumina fibres are produced if the fibre is subjected to the action of a basic substance before, or simultaneously with, the hydrothermal treatment.

Thus according to the present invention we provide a process for the preparation of a fibre comprising alumina or an alumina hydrate which includes the steps of
a. fibrising a composition comprising an aluminium compound having an acid anion and decomposable to alumina, an organic polymer in an amount by weight less than the aluminium compound and a solvent for the aluminium compound and the organic polymer
b. removing at least part of the solvent from the fibre
c. subjecting the fibre to the action of ammonia or a basic amine, and
d. subjecting the fibre to hydrothermal treatment to decompose at least partially the aluminium compound to alumina or an alumina hydrate.

The fibre may be subjected to the action of ammonia or the basic amine before, or simultaneously with, hydrothermal treatment. The hydrothermal treatment may be effected at the same time as the removal of solvent from the fibre or as a subsequent separate step.

Most conveniently, ammonia or basic amine treatment is done in the vapour phase and the fibres may be so treated before or after collection, for example in the form of a loose blanket. In embodiments where the fibre is subjected to ammonia or a basic amine before hydrothermal treatment, the fibres should preferably not be dehydrated, unless humidified air is mixed with the basic substance. The temperature at which the fibre is subjected to ammonia or basic amine should preferably be less than the temperature at which subsequent hydrothermal treatment is carried out. For fibres prepared from aluminium oxychloride, the treatment may conveniently be carried out at ambient temperature with humid air containing more than 50 parts per million by weight of ammonia or substantially pure ammonia. If the ammonia or basic amine is mixed with the steam used in the hydrothermal treatment, we find that considerably larger amounts are required to produce the desired effect on the fibre.

The precise mechanism whereby the use of ammonia or a basic amine assists the process is not fully understood, but it is believed that the release of acid anion is assisted by the formation of a soluble substance which is more easily removed in the hydrothermal treatment.

It is to be understood that the aluminium compound may form a true solution or a colloidal solution (a sol) with the solvent.

Preferably the composition contains at least twice as much aluminium oxide equivalent as organic polymer. More preferably the organic polymer comprises less than 10% by weight of the aluminium oxide equivalent of the aluminium compound, for example from 0.1% to 8% by weight.

The aluminium compound is preferably polymeric or capable of forming a polymeric compound in solution; more preferably it is a water-soluble compound, for example an aluminium salt which gives a viscous solution or sol in water. Conveniently the water-soluble aluminium compound may be a compound selected from the group consisting of the chlorides, sulphates, acetates, formates, propionates, oxalates, phosphates and nitrates or mixtures thereof. Especially preferred are aluminium oxychloride, basic aluminium acetate, basic aluminium formate, basic aluminium nitrate, mixtures thereof or mixed compounds thereof.

The solvent is preferably a polar solvent, for example an alcohol, especially methanol or ethanol, glacial acetic acid, dimethyisulphoxide or dimethylformamide. It is especially convenient to use water as the solvent. Mixtures of solvents may be used.

The organic polymer is preferably a water-soluble organic polymer, conveniently a non-ionic water-soluble organic polymer, a polyhydroxylated organic polymer or a natural water-soluble gum. The organic polymer is preferably thermally-stable under the conditions of fibrising, for example from ambient temperature to within several degrees of the boiling point of the solvent. Examples of preferred organic polymers include:
polyvinyl alcohol
polyacrylamide and partially hydrlysed polyacrylamide
polyacrylic acids
polyethylene oxides
carboxyalkyl celluloses, for example carboxymethyl cellulose
hydroxyalkyl celluloses, for example hydroxymethyl cellulose
alkyl celluloses, for example methyl cellulose
hydrolysed starches
dextrans
guar gum
polyvinyl pyrrolidones
polyethylene glycols
alginic acids
polyisobutylene derivatives
copolymers of polysiloxanes, for example with polyethylene oxide
polyurethanes, and
esters, copolymers or mixtures thereof.

Most preferred organic polymers are straight-chain polyhydroxylated organic polymers, for example polyvinyl alcohol (partially hydrolysed polyvinyl acetate); polyvinylpyrrolidone; or polyethylene oxide.

Conveniently the molecular weight of the organic polymer is in the range $10^3$ to $10^7$, preferably as high a molecular weight as is consistent with the ability of the organic polymer to dissolve in the solvent used in the process of the invention. For example, it is preferred for the polyvinyl alcohol or partially hydrolysed polyvinyl acetate to have a medium or high molecular weight, for example from 75,000 to 125,000, the polyethylene oxide to have a molecular weight of $10^4$ to $10^6$ and the polymers derived from cellulose to have a molecular weight of 10,000 to 50,000.

It is preferred that the concentration of organic polymer in the composition be from 0.1% to 10% by weight, more preferably from 0.5% to 3% by weight.

The composition may conveniently be prepared by dissolving the aluminium compound and the organic polymer in the solvent. The order in which dissolution is carried out is not critical, and may be chosen for maximum convenience in each embodiment. An aqueous sol may conveniently be made by hydrolysis or heating of an aqueous solution of the aluminium compound. The aluminium compound or the organic polymer may be formed from suitable precursors, usually in the presence of the solvent. Thus the aluminium compound may be prepared by dissolving aluminium hydroxide in the appropriate acid in such proportion to give a basic salt, for example $Al(OH)_5Cl$ may be made by dissolving aluminium hydroxide in hydrochloric acid, aluminium metal in aqueous hydrochloric acid or aluminium ethoxide in aqueous hydrochloric acid.

Any convenient method of fibrising may be used, for example centrifugal spinning, drawing, blowing, tack-spinning, extrusion through a spinneret or suitable combinations thereof. Fibrising by blowing is effected as hereinafter described.

The viscosity of the composition is preferably one suited to the fibrising method employed. Conveniently the viscosity is in the range 0.1 to 3000 poise, preferably 100 to 1000 poise when fibrising is effected by extrusion of the composition through a spinneret to form a continuous filament. Fibrising of compositions of low viscosity, for example 0.1 to 100 poise, is preferably carried out by a blowing process as hereinafter described.

It is preferred to remove solvent from the fibre by evaporation, for example by heating at a temperature from 30°C to 110°C, optionally under reduced pressure.

By hydrothermal treatment is meant the simultaneous action on the fibre of heat and water vapour.

Hydrothermal treatment of fibres prepared from aqueous solution may be effected by heating them above 100°C in an enclosed space so that the steam produced on dehydration of the fibres is available to treat the fibres. It is preferred, however, to effect hydrothermal treatment with added steam at a temperature of at least 200°C. It is preferred to use steam at a temperature of 200°C to 800°C, most preferably at a temperature of 250°C to 500°C, for example substantially 350°C. The time of heating in steam may be varied over wide limits; preferably heating times of two minutes to give hours are used, most preferably two minutes to thirty minutes. The pressure of steam used may be varied widely, for example from 0.5 to 50 atmospheres, but the steam is most conveniently used at atmospheric pressure. The steam may contain other gases, for example air; it is preferable that the proportion of other gases in the steam does not exceed 50% by volume and most preferably does not exceed 10% at substantially atmospheric pressure.

It is preferred to heat the fibre before treatment with steam in order to prevent condensation on the fibre.

Fibrising by extrusion through a spinneret is especially useful in producing continuous fibre. Staple fibre is conveniently produced by centrifugal spinning, tack-spinning or blowing. Fibrising is most conveniently carried out at the ambient temperature, but if desired it may be carried out at any other temperature at which the fibrising composition is stable. For example, it may be convenient in some embodiments to vary the temperature in order to produce the viscosity of the composition appropriate for fibrising.

Fibrising by blowing comprises extruding the fibrising composition, especially an aqueous composition, through on or more apertures into at least one gas stream having a component of high velocity in the direction of travel of the extruded composition. The dimensions of the aperture through which the fibrising composition is extruded may vary widely. We prefer to use an aperture having at least one dimension larger than 50 microns and smaller than 500 microns. The aperture may have a variety of shapes, for example we have used circular, triangular and star-shaped apertures. It is convenient in some embodiments to extrude the fibrising composition through a slit which may be substantially straight or curved, for example in the case of an annular slit. A plurality of apertures may be used in one extrusion head. The material in which the aperture is formed may be chosen from a wide variety of substances. A metal, for example stainless steel or monel, is especially useful. Owing to the fact that the fibrising composition may be at or near ambient temperature during extrusion and that low extrusion pressures are used, it is convenient, especially from the point of view of cheapness, to use a plastics material in which to form the aperture; suitable plastics materials include polystyrene, polypropylene, polyvinyl chloride and polytetrafluoroethylene.

It is preferred to use two gas streams which converge at or near the point where the fibrising composition is extruded from the aperture; preferably the angle between the converging gas streams is from 30° to 60°. In preferred embodiments, gas streams emerge from slots on each side of a row of apertures or a slit; or a conically-shaped gas stream emerges from an annular slot arranged substantially concentrically around an annular extrusion slit. The velocity of the gas stream may be varied over a wide range; we prefer to use velocities in the region of 40 to 1500 ft per second. Air is the preferred gas, most conveniently air at ambient temperature.

The viscosity of the fibrising composition is preferably less than 3000 poise, most preferably from 0.1 to 100 poise, especially when fibres of very small diameter are desired.

The extruded composition is drawn down by the action of the gas stream upon it. A draw-down factor of about 20 is usual. In order for this draw-down to be effected, especially for very fine fibres (e.g. 0.5 – 10 microns), it is preferred that the viscosity of the extruded composition be maintained substantially constant, or not increased too much during the draw-down stage. This means that loss of solvent from and/or gelling of the composition should be suitable controlled. Such control may conveniently be effected by a suitable choice of velocity, temperature or, more especially, the degree of saturation of solvent in the gas stream, or a combination of two or more of these factors. In order to reduce the loss of solvent from the composition to a minimum, as is normally required, it is useful to use a gas which is saturated, or almost so, e.g. above 60% saturation, with the solvent vapour. For fibrising aqueous compositions, a gas, for example, air, at a relative humidity of at least 80% is especially useful.

The distance separating the point of emergence of the gas stream from the extrusion aperture should be as small as possible; we prefer that the distance between the closest edges of the aperture and the air slot be less than 0.25 mm.

The pressure employed to extrude the fibrising composition will depend on the viscosity of the composition, the size and shape of the aperture and the desired rate of extrusion. We find that pressures from 16 to 120 lb per square inch absolute are convenient for compositions having viscosities up to about 100 poise.

The fibre may be dried further after attenuation in the gas stream if required. The fibre is then subjected to the action of ammonia or a basic amine and to hydrothermal treatment as hereinbefore described, preferably after collection in the form of a loose blanket. The fibre may also optionally be subjected to further processing which may be required, for example it may be heated to complete the decomposition of the aluminium compound to alumina or alumina hydrate or to decompose any residual organic material in the fibre, to change the crystalline form of the alumina or to sinter the fibre. Typically, the fibre may be heated at a temperature from 500°C to 1200°C for a period of from one minute to one hour, preferably 500°C to 800°C for 1 minute to 1 hour.

Various additives may be included in the fibre, singly or in combination, conveniently by adding them to the composition from which the fibre is formed. Additives may also be included on the surface of the fibre by any suitable treatment process. Examples of additives which may be included are:
 a. alkaline earth compounds, for example compounds of magnesium or calcium, decomposable to alkaline earth oxides;
 b. acid oxides, especially $SiO_2$, $B_2O_3$ or $P_2O_5$, $ZrO_2$ or compounds which decompose to form acid oxides;
 c. catalyst materials, for example Pt, Sb, Cu, Al, Pd, Ag, Ru, Bi, Zn, Ni, Co, Cr, Ti, Fe, V or Mn in elemental or compound form;
 d. fluorides, for example HF, NaF or $CaF_2$;
 e. alkali metal compounds for example compounds of lithium, sodium or potassium;
 f. reinforcing particles or fillers such as colloidal silica;
 g. colouring agents, for example mordant dyes or pigments;
 h. rare earth oxides or yttria or precursors thereof.

The catalyst material may be present on the external surface of the fibre or it may be included within the fibre. In some embodiments, the catalyst material may be partly within the fibre and partly on its external surface. One or more catalyst materials may be present.

When at least part of the catalyst material is included in the fibre, it is convenient to disperse or dissolve the catalyst material, or a precursor therefor, in the composition from which the fibre is formed. By precursor is meant a material which when suitably treated, for example by heating or reduction, will generate a catalyst material, directly or indirectly. Alumina or alumina hydrate fibres comprising a catalyst material may be used in a wide variety of catalytic processes as hereinafter described.

The alumina in the fibre is either non-crystalline or predominantly in its eta form or both, and alphaalumina is not generally produced at temperatures below 1000°C.

The invention thus provides a fibre comprising alumina or an alumina hydrate which may be in continuous or discontinuous lengths, although discontinuous fibres may have very high ratios of length of diameter, for example greater than 5000. The fibres are generally of small diameter, typically from 0.5 to 5.0 microns. As a result of the avoidance of formation of undesirable crystal forms of alumina such as alpha-alumina as hereinbefore referred to, the fibres show remarkable resistance to physical change at high temperature, for example from 700°C to 1200°C. In general, it is found that by the use of ammonia or a basic amine conjunction with hydrothermal treatment, fibres are obtained having a higher BET surface area after calcination and in which the alumina has a smaller mean crystallite size after calcination than otherwise obtainable. Fibres in which the alumina has a crystalline size of 40–70 Angstrom units are obtained, and furthermore these sizes are substantially maintained for considerable periods of time for example up to 6 hours when the fibre is heated at 900°C.

The fibres may be collected as individual fibres or they may be collected in the form of a yarn, mat, blanket or felt. Mats, blankets or felts are conveniently formed by collecting the fibres on a moving band, preferably a band of foraminous material, for example steel mesh. The fibres may be collected on a mould to provide a shaped felt. If desired the fibres may be bonded together, for example by collecting the fibres before they are dry and heating the resultant mat or felt. Bonding may also be effected by the use of a binding agent. The mat or felt may be compressed, if desired, for example to increase its density. The invention is especially useful in preparing glassy fibres. Fibres spun into yarn may be made up as cloth.

The fibres produced according to the invention may be used for a variety of purposes. They may be used, for example, as high temperature insulation materials or as catalyst supports in high temperature reactions. The fibres may generally be used as filler; reinforcement for resins, metals and ceramics; filters; catalyst supports or fibrous catalysts.

Fibrous catalysts according to the invention comprising the metals copper, ruthenium, nickel, palladium, platinum or silver, or combinations thereof, are especially useful in processes such as the following:
 dehydration of alcohols
 methanol synthesis
 reduction of nitrobenzene
 ammonia decomposition
 steam reforming of naphtha or natural gas
 hydrogenation of olefins, aromatics, nitrides, fats and oils
 sulphur dioxide oxidation
 hydrodealkylation
 methane ammoxidation
 ethylene oxide from ethylene
 formaldehyde from methanol.

Semiconductor oxides are useful catalyst materials. For example, $Cr_2O_3$ 'eta' alumina may be used for paraffin dehydrogenation or naphtha reforming.

Metallic halides, for example $CuCl_2$, $SbCl_3$, $AlCl_3$ or $CrCl_3$, provide fibrous catalysts which are useful for a variety of chlorination and oxychlorination reactions or isomerisation of paraffins, olefins and aromatics.

Organo-metallic catalysts may be best employed in the invention by soaking or coating of the pre-formed fibre. The fibrous catalysts are useful in producing ethylene oligomers, polyethylenes and polyesters. Metal carbonyls, for example $HCo(CO)_4$, provide fibrous catalysts suitable for carrying out OXO processes.

The fibrous catalysts, especially those containing platinum, palladium, molybdenum, $Co_3O_4$, $V_2O_5$ or $Cr_2O_3$, $MnO_2$, $Fe_2O_3$ or NiO, or combinations thereof, may be used in the treatment of car exhaust gases, for example in an afterburner.

Other catalytic materials found useful include:
cobalt molybdate
nickel molybdate
bismuth molybdate
copper molybdate
zinc chromite
cobalt oxide, $Co_3O_4$.

Fibrous catalysts according to the invention are advantageous owing to their high external surface areas; they are heat-resistant and mechanically strong.

The invention is thus useful in producing shaped bodies comprising alumina or alumina hydrate, especially fibres which may be of very small diameter, dense, white, strong and of high modulus. The bodies, especially the fibres, may conveniently be used, for example as high temperature insulating materials, fillers, as reinforcement for resins, metals and ceramic materials, inert filters, catalysts or catalyst supports.

The invention is illustrated, but not limited, by the following Examples:

EXAMPLE 1

A spinning solution was prepared by dissolving in water polyethylene oxide with a molecular weight of 300,000 and aluminium chlorohydrate powder. The solution contained 28% w/w equivalent of alumina $Al_2O_3$, and 1% w/w of the organic polymer and had a viscosity measured at 25°C of 15 poise.

Fibres were spun from the solution by extruding from small holes into a high-velocity stream of air at 90% relative humidity, which subsequently entrained air at ambient humidity. Fibres with a mean diameter of four microns were collected on a gauze.

The fibres were heated for 15 minutes at 350°C in a stream of steam containing 10% by volume of ammonia. After this treatment the Al:Cl ratio in the fibre was reduced from 2:1 to 20:1. The fibres were subsequently calcined at 900°C for ½ hour to give strong white flexible products with an average crystallite size of 50 A in the eta alumina phase, and a mean pore radius by the BET nitrogen adsorption method of 27 A.

EXAMPLE 2

Fibres were spun as described in Example 1 from an aqueous solution containing 1% w/w of polyethylene oxide (molecular weight 300,000), 28% w/w $Al_2O_3$ and an Al:Cl atomic ratio of 2:1 in the solution.

The fibres were collected on a wire belt and passed through a chamber through which flowed air containing 2000 parts per million of ammonia. After this treatment the fibres had picked up 4% w/w of ammonia and spots of ammonium chloride could be observed on the fibre surfaces when viewed under a microscope. The fibres were then carried on the belt into a steam atmosphere at 400°C, where they remained for five minutes. They were subsequently calcined in air at 900°C for ten minutes. The product fibres were strong, white and flexible and had a BET surface area of 150 m²/g when dehydrated at 280°C. The crystallite size of the fibres was 50 A after further calcination at 900°C for 1 hour.

EXAMPLE 3

Fibres spun and collected in the manner described in Example 1 were treated with a stream of dry air containing 100 parts per million of ammonia for three minutes at room temperature. On analysis these fibres had picked up only 0.2% ammonia by weight. On repeating the experiment using 100 parts per million of ammonia in air at ambient humidity (about 70% RH) the ammonia pick-up was 2.7% by weight, and on steaming for five minutes at 380°C and calcination at 900°C for fifteen minutes a strong white product was obtained with an average crystallite size of 60 A as measured by standard X-ray methods.

EXAMPLE 4

Fibres produced from an aqueous aluminium oxychloride solution containing polyethylene oxide as in Example 1, were collected on a gauze and treated with triethylamine vapour. Air was bubbled through triethylamine in a 'Dreschel' bottle, passed through the collected fibre mass, then vented into a fume hood. The fibres were heated in steam at 350°C for fifteen minutes, and subsequently calcined in air at 900°C for 15 minutes to give a strong white product with a mean crystallite size of 60 Angstroms as determined by X-ray line broadening methods.

What we claim is:

1. A process for the preparation of a fiber comprising alumina or an alumina hydrate which includes the steps of:
   a. fibrising by extrusion through an aperture a composition having a viscosity in the range 0.1 to 3000 poise and comprising (i) a water-soluble aluminum compound decomposable to alumina and selected from the group consisting of the chlorides, sulphates, acetates, formates, propionates, oxalates, phosphates and nitrates of aluminum or mixtures thereof, (ii) a water-soluble organic polymer having a molecular weight in the range $10^3$ to $10^7$ and present in an amount by weight of 0.1 to 10 percent of the aluminum oxide equivalent of the aluminum compound and an amount by weight less than the aluminum compound and (iii) water;
   b. removing at least part of the water from the fiber;
   c. subjecting the fiber to the action of ammonia or a basic amine; and
   d. subjecting the fiber to hydrothermal treatment at a temperature of 200°C to 800°C and a pressure in the range 0.5 to 50 atmospheres to decompose at least a substantial proportion of the aluminum compound to alumina or an alumina hydrate.

2. A process as claimed in claim 1 wherein the organic polymer comprises less than 10% by weight of the aluminium oxide equivalent of the aluminium compound.

3. A process as claimed in claim 2 wherein the organic polymer comprises from 0.1% to 8% by weight of the aluminium oxide equivalent of the aluminium compound.

4. A process as claimed in claim 1 wherein the alumina compound is aluminium oxychloride, basic aluminium acetate, basic aluminium formate, basic aluminium nitrate, mixtures thereof or mixed compounds thereof.

5. A process as claimed in claim 1 wherein the organic polymer is a straightchain polyhydroxylated polymer.

6. A process as claimed in claim 1 wherein the organic polymer is polyvinylalcohol.

7. A process as claimed in claim 6 wherein the polyvinylalcohol has a molecular weight of 75,000 to 125,000.

8. A process as claimed in claim 1 wherein the organic polymer is polyvinylpyrrolidone or polyethylene oxide.

9. A process as claimed in claim 8 wherein the polyethylene oxide has a molecular weight of $10^4$ to $10^6$.

10. A process as claimed in claim 1 wherein the hydrothermal treatment is effected at a temperature of 250°C to 500°C.

11. A process as claimed in claim 1 wherein the duration of the hydrothermal treatment is from 2 minutes to 30 minutes.

12. A process as claimed in claim 1 wherein the fibre is heated subsequent to hydrothermal treatment.

13. A process as claimed in claim 12 wherein the fibre is heated at 500°C to 2000°C.

14. A process as claimed in claim 13 wherein the fibre is heated at a temperature from 500°C to 1200°C.

15. A process as claimed in claim 1 wherein fibrising is effected by centrifugal spinning, blowing, tack-spinning or extrusion through a spinneret.

16. A process as claimed in claim 15 wherein fibrising by blowing comprises extruding the fibrising composition through one or more apertures into at least one gas stream having a component of high velocity in the direction of travel of the extruded composition.

17. A process as claimed in claim 16 wherein two gas streams converge at or near the point where the composition is extruded from the aperture.

18. A process as claimed in claim 17 wherein the angle between the converging gas streams is from 30° to 60°.

19. A process as claimed in claim 16 wherein the gas is more than 60% saturated with the solvent vapour.

20. A process as claimed in claim 16 wherein the gas is air.

21. A process as claimed in claim 20 wherein the air is at a relative humidity of greater than 80%.

22. A process as claimed in claim 1 wherein the temperature of treatment with ammonia or the basic amine is lower than the temperature at which subsequent hydrothermal treatment is carried out.

23. A process as claimed in claim 1 wherein an aqueous solution of aluminium oxychloride is fibrised and the fibre subjected to humid air containing more than 50 parts per million of ammonia or substantially pure ammonia.

* * * * *